United States Patent
Antonetti

(10) Patent No.: US 7,204,546 B2
(45) Date of Patent: Apr. 17, 2007

(54) VEHICLE CAB SLIDE PIVOT

(75) Inventor: Thomas Antonetti, Fresno, CA (US)

(73) Assignee: Saf-T-Cab, Inc., Fresno, CA (US)

( * ) Notice: Subject to any disclaimer, the term of this patent is extended or adjusted under 35 U.S.C. 154(b) by 22 days.

(21) Appl. No.: 11/078,528

(22) Filed: Mar. 11, 2005

(65) Prior Publication Data

US 2006/0202514 A1 Sep. 14, 2006

(51) Int. Cl.
*B62D 33/063* (2006.01)
(52) U.S. Cl. .............................. 296/190.04; 180/89.13
(58) Field of Classification Search .......... 296/190.04, 296/190.07; 180/89.12, 89.13
See application file for complete search history.

(56) References Cited

U.S. PATENT DOCUMENTS

| | | | | |
|---|---|---|---|---|
| 3,182,605 A | * | 5/1965 | Brasher | 105/342 |
| 3,595,409 A | * | 7/1971 | Bowman-Shaw | 414/544 |
| 3,841,429 A | * | 10/1974 | Falcone et al. | 180/327 |
| 4,421,188 A | * | 12/1983 | Fredriksen | 180/327 |
| 4,451,079 A | * | 5/1984 | Takahashi | 296/190.07 |
| 5,199,193 A | * | 4/1993 | Akiba et al. | 37/341 |
| 5,236,294 A | * | 8/1993 | Willis | 414/24.5 |
| 5,618,146 A | * | 4/1997 | Cooper | 414/24.5 |
| 6,408,971 B1 | * | 6/2002 | Grant | 180/89.13 |
| 7,004,275 B1 | * | 2/2006 | Junga et al. | 180/89.13 |
| 2004/0217628 A1 | * | 11/2004 | Neunteufel et al. | 296/190.04 |

FOREIGN PATENT DOCUMENTS

| | | | | |
|---|---|---|---|---|
| JP | | 63013867 A | * 1/1988 | 180/89.13 |

OTHER PUBLICATIONS

Caterpillar, Mini Hydraulic Excavators, web page, 2005, 3 pages, available at http://www.cat.com/cda/layout?m=50146&x=7.
Manitowoc Crane Group, Grove RT530E product guide, 2004, 12 pages, available at http://www.groveworldwide.com/na/eng/crane/rt/rt530e/RT530E%20PG.pdf.
Ingersoll-Rand, Alexander DD 95, web page, 2005, 2 pages, available at http://www.ir-abg.com/eng/1187.html.

* cited by examiner

*Primary Examiner*—D. Glenn Dayoan
*Assistant Examiner*—Paul Chenevert
(74) *Attorney, Agent, or Firm*—Mark D. Miller

(57) ABSTRACT

The present invention is a vehicle or machine cab slide and pivot apparatus for safely improving the view of the operator in the cab. The invention includes a slide rail assembly, a rotational assembly, and an operator compartment. The slide rail assembly is attached to and runs horizontally along a body of the vehicle or machine and supports a slidable carriage. A rotational assembly is pivotally attached to the carriage and to an operator compartment. The invention allows the operator compartment to safely traverse and/or rotate along the entire length of the slide rail assembly.

23 Claims, 10 Drawing Sheets

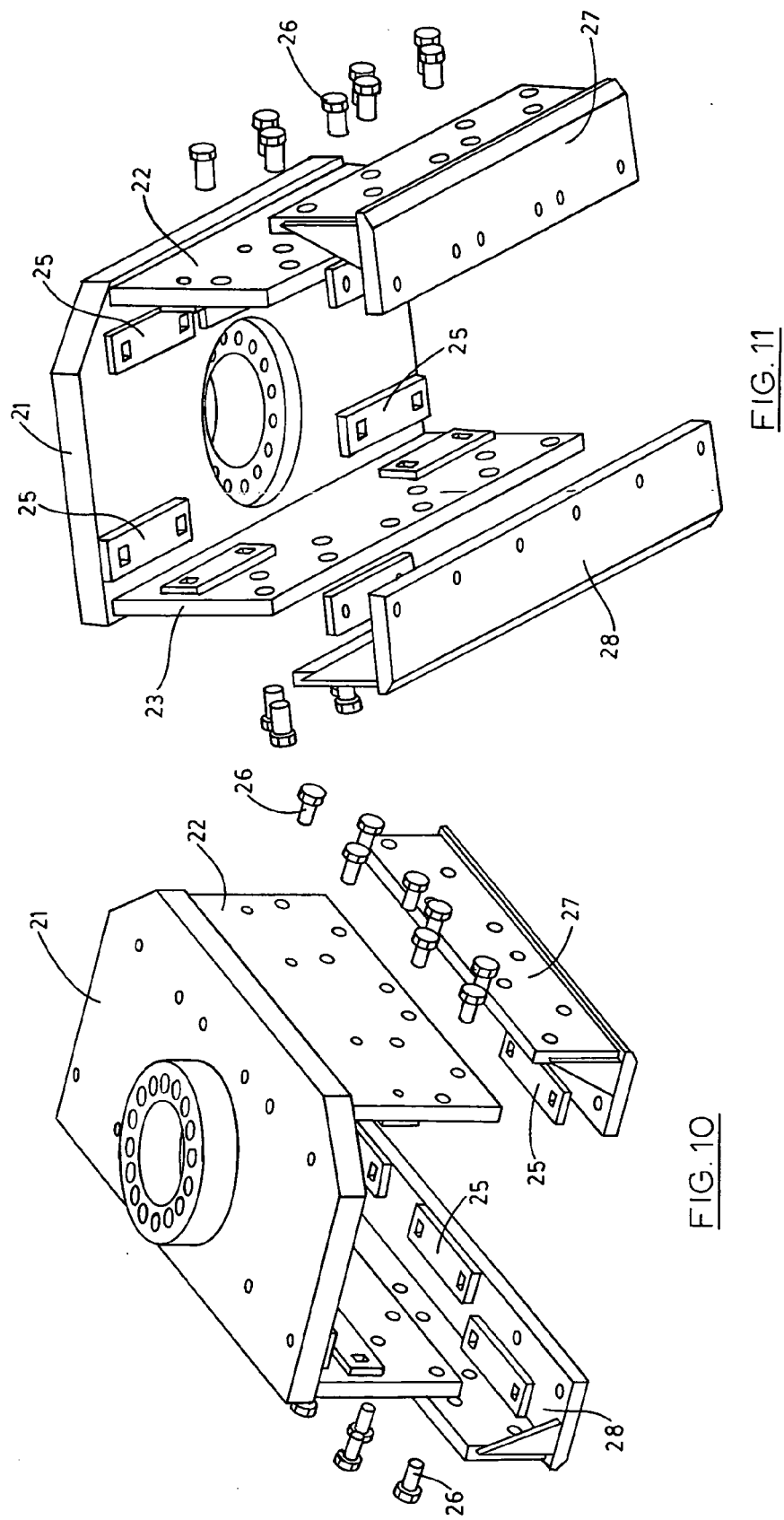

VEHICLE CAB SLIDE PIVOT

BACKGROUND OF THE INVENTION

1. Field of the Invention

The present invention relates to assemblies for the attachment of an operator compartment to the body of a vehicle, and more specifically to a new and improved assembly allowing for the simultaneous lateral and rotational movement of the operator compartment along the assembly.

2. Description of the Prior Art

Vehicles, particularly industrial vehicles, ordinarily have a seat, cab or compartment where the operator is positioned. Controls for the vehicle are located conveniently in front of the seat, or within the cab or compartment. For safety reasons cabs or compartments have been widely used in the art to prevent injury to the operator of the machine due to improper use, including rollover injury. While increasing safety, the inclusion of a cab or compartment can limit the motion and visibility of the operator of the machine. This can create inefficiencies as it increases the probability of error in the use of the vehicle. Since the cab or compartment must be reinforced to properly protect the operator, it is impossible to create perfect visibility from the cab. In many cases the cab is in a fixed position, and because of the dimension of the vehicle, critical lines of sight may be obstructed by portions or components of the vehicle itself.

It is known in the art to have vehicles and machinery where the cab or operator compartment turns or swivels relative to the vehicle chassis. While this movement changes the view of the operator, this view remains static with respect to the components of the machine involved. The static position of the operator can impair the operator's view with respect to the function of the vehicle.

The use of asphalt compactors are well known in the art. Asphalt compactors ride upon two large steel drums. The drums are located in the back and the front of the compactor. The drums are of a large circumference. The body of the compactor sits above and between the large steel drums. Because of the large circumference of the steel drums, the operator of the machine is relatively far from the ground. The size and the bulk of the machine can impair the operator's view of the asphalt which is to be compacted.

Traditionally such machines have a fixed seat, cab, or compartment for the operator. Depending on the machine, the seat or cab may be fixed near the center of the compactor, or it may be located toward one or the other of the sides of the compactor. If the cab is placed closer to one of the edges of the machine, it allows for the increased visibility of the asphalt and ground on that side of the machine upon which the seat is positioned. Unfortunately, the view of the other side of the machine is significantly impaired by such placement.

When compacting asphalt, it is of significant importance to ensure that all the asphalt is being compacted. This can be extremely difficult on a large compactor, where visibility is diminished. To overcome this problem compactors have been installed with an apparatus connecting the operator compartment to the compactor allowing for the lateral movement of the cab on the compactor. The lateral movement increases visibility by allowing the operator to get closer to ether side of the compactor to see the location of the compactor with respect to the already compacted asphalt. Even with the cab of the compactor fully extended to either side, it may not be possible for the operator to see the relationship of the edge of the steel drums of the compactor to the road surface which he or she is compacting.

An existing machine provides a large cab area in which the operator seat is attached to a ball bearing apparatus on a track. The seat is capable of movement back and forth along the track inside the large cab using a pin dropped into a hole to fix the seat position. Such a device may provide some improvement to the operator's field of view, but does not allow any lines of sight outside of the profile of the vehicle itself.

When paving large areas of asphalt, it is imperative that all the asphalt is compacted. To ensure this, the operator must run the edge of the steel drums of the compactor over the finished mat (compacted asphalt) to ensure that no portion of unfinished mat (un-compacted asphalt) remains. If the operator is unable to see the relationship of the finished mat to the steel drums of the compactor, then there is a greater chance that the operator will over-compensate, and run the compactor over a large portion of the finished mat; or worse, run off the asphalt onto the embankment thereby destabilizing the vehicle which could tip or roll over. Alternatively, the operator may under estimate the distance of the compactor to the unfinished mat, and leave a portion of unfinished mat between the strips of finished mat. At a minimum either situation creates inefficiencies as further runs over the asphalt will be required to fully compact the asphalt, not to mention the danger of a possible rollover.

Because compactors run at relatively slow speeds, if the operator misses a strip of pavement, the inefficiency is exaggerated as the operator must again slowly run the compactor along the length of the strip. If the contractor is constantly running over more of the finished mat than is needed, more runs of the compactor will be needed to accomplish the entire compacting of the asphalt surface, wasting time and resources.

With regard to other vehicles and off-highway machinery, it is also imperative to visually see the ground surface on any given side of the machinery. Usually machinery will have a fixed operator compartment, which severely restricts the operator's view. Therefore the operator must either rely on his or her own peripheral sense or enlist the help of co-workers outside of the machinery to properly perform the function involved. This results in increased labor costs for extra employee(s) needed to guide the operator of the machinery. There is also an increased risk of damage or injury to the off-highway machinery, the operator, and/or site workers from the impaired views.

It is therefore desirable to provide an apparatus for improving the lines of sight of an operator of a vehicle, including off-highway machinery and asphalt compactors, by providing an operator compartment or cab that is capable of wide-ranging movement relative to the vehicle itself.

SUMMARY OF THE INVENTION

The present invention improves the lines of sight of a vehicle operator by providing a support apparatus for a vehicle cab that is capable of slidable and rotatable movement relative to the vehicle itself. The cab slide-pivot apparatus of the present invention includes a slide rail assembly, a movable support carriage, a rotational assembly and an operator compartment. The slide rail assembly is attached to and runs on a generally horizontal plane along a body of a vehicle. The carriage slides along the rail. The rotational assembly is pivotally attached to the carriage, and is connected to the operator compartment or cab. This configuration allows the operator compartment to travel with the carriage in a lateral direction along the rail, and to also rotate clockwise or counterclockwise relative to the carriage.

The lateral and rotational movements of the carriage may be performed independently or simultaneously, depending on the desires of the operator. Thus, the operator may slide and/or turn the operator compartment to improve the view from within. The present invention is designed to be used with a multitude of vehicles including, but not limited to industrial and off-highway machinery.

The rail assembly is fixedly attached to the frame or body of the machinery, through any conventional means including, but not limited to, welding, fasteners, or clamps, preferably including vibration reduction accessories. The rail can be attached in any direction on the vehicle, provided adequate clearance of the operator compartment is maintained with respect to other moving or non-moving parts of the machine. Preferably, the rail is installed so that it extends from one side of the vehicle to the other. The rail may be a solid member, but is preferably provided in the form of a sturdy hollow sleeve having any suitable cross sectional configuration, which is preferably generally rectangular, but may be square, oblong, circular, elliptical, oval or the like. The carriage is slidably deployed along the rail, and supports a rotatable member, preferably in the form of a gear. The carriage is in the form of a partial sleeve that fits over the rail, having a cross-sectional configuration that corresponds to that of the rail. The partial sleeve of the carriage fits closely around a portion of the inner sleeve of the rail for secure slidable (lateral) movement along the rail. The movement of the carriage is limited based on the length of the rail. In one embodiment the rail has stops on each of its respective ends to prevent damage to the rail from the movement of the carriage, or for that matter injury to the operator riding in the operator compartment. The carriage includes a mount for supporting the rotational assembly described below.

In the preferred embodiment, the hollow rail has a generally rectangular cross section, and the carriage includes a corresponding partial sleeve having a cross section generally in the form of an inverted "U" that corresponds to and fits over the top of the rail. In this embodiment, clamping assemblies are attached to each of the legs of the inverted "U" of the carriage sleeve. These assemblies have a generally "L" shaped cross section, the lower legs of which fit closely under the rail to secure the partial sleeve in place, preventing dislodgement.

The rail preferably includes an opening or channel along all or a portion of its length through which wires and connectors are provided leading from the vehicle chassis to the controls in the operator compartment. The rotational member and carriage have corresponding openings to allow for the passage of these wires and connectors from inside the rail to the operator compartment. The wires are preferably included in a cabling system having couplings at either end (one end in the cab, the other end in or below the rail) for easy replacement.

A force output device is provided having one end attached to the carriage to impart movement thereto. The opposite end of the force output device is connected either to the rail or to the body/chassis of the vehicle. Preferably, the force output device is in the form of a telescoping member powered by the hydraulic system provided with the machine. The device is capable of imparting motion to the carriage in either lateral direction along the rail. However, numerous alternative embodiments may be provided for imparting lateral movement to the chassis. In one alternative embodiment, two force output devices may be provided, one for creating force in each of the respective lateral directions of the rail. In another alternative embodiment, a piston may be used to provide lateral force to the carriage. In yet another embodiment, the carriage may be attached, directly or indirectly, to a large rotatable screw member such that lateral movement is imparted in one direction by the clockwise rotation of the screw, and in the other direction by the counterclockwise rotation of the screw. In other embodiments, other force output devices can be used to impart lateral movement to the carriage, such as electronic servo motors, chain drives and sprockets, belts, or other sources of force available in the machine.

The rotational assembly of the invention is pivotally attached to the carriage, and includes a least one rotatable gear oriented in a horizontal plane together with a rotation-imparting member such as a motor coupled to the gear. In one embodiment, the rotation-imparting member may be a worm drive coupled to an associated gear. A mount plate is attached to the gear, and the vehicle cab or operator compartment is attached to the plate, and includes vibration dampers thereon. The rotation-imparting member may be operated by hydraulic pressure, electricity or other available means. The rotation-imparting member transmits force to the gear and causes it to rotate, turning the attached operator compartment or cab. In an alternative embodiment, the drive may be attached to and movable with the mount plate and cab, and the gear remains fixed such that the rotation-imparting member rotates with respect to the fixed position gear. The relative movement of the gear to the motor creates rotational movement thereby causing the operator compartment to swivel. The operator compartment is capable of at least one hundred and eighty (180) degrees of rotation in either direction (clockwise or counterclockwise) from its initial forward orientation, for a total of as much as three hundred sixty (360) degrees of rotation. The gear of the rotational assembly and the mount plate also include central openings to allow the passage of control wires and connections from the carriage to the operator compartment without exposing them to rotational fatigue.

In an alternative embodiment, the rotational assembly can consist of some other device or combination of devices rather than gears to create the rotational force.

The operator compartment is attached to a cab support plate of the rotational assembly. As a result of the lateral movement created by the carriage along the rail, and the rotational movement created by the rotational assembly, the operator compartment is capable of traveling the length of the rail, while simultaneously being able to pivot or rotate around the rotational assembly. In a preferred embodiment, the length of the slide rail is approximately the same as the width of the vehicle, although it may be longer or shorter. In alternative embodiments, the rail may extend outward beyond one or both sides of the vehicle.

When the slide rail extends the full width of the vehicle (or beyond), the operator may slide the cab laterally to the edge of the vehicle thereby improving the view from the cab for critical operations at that edge. The operator may also slide the cab to the opposite edge for improved viewing of operations there. However, this lateral movement alone may not be enough to sufficiently improve the lines of sight. Because the operator compartment of the present invention is also capable of rotational movement, once it reaches either edge (or at any location between them), the view may be further improved by rotating the compartment in an appropriate direction. When the compartment has been moved laterally to one end of the rail, rotation of the compartment will often extend it beyond the edge of the vehicle thereby greatly improving the view along the side of the vehicle.

The invention is designed for balance and safety, especially in situations where the cab is moved to one end of the rail, and then rotate out away from the vehicle. The rail and carriage are preferably made from strong, heavy metal to provide proper support for the moveable cab, and to provide sufficient mass to balance against the cab when moved to extreme positions to avoid tipping over the vehicle. The cab itself has a sturdy yet lightweight metal frame that is designed to withstand a rollover should the vehicle tip during use. It is to be appreciated that the moveable cab of the present invention provides more safety to the operator in the event of a rollover than a simple unprotected moveable seat.

In one embodiment, the present invention is installed on an asphalt compactor. Through the lateral movement and rotation of the operator compartment, the operator can move the compartment to either side of the asphalt compactor to see the ground surface and the side of the steel drums of the asphalt compactor. This allows the operator to conveniently and safely see and control the path of the compactor and ensure that the asphalt is properly compacted. In addition, the operator is quickly able to move the cab to the opposite side of the compactor to see the ground surface on the other side. This allows the operator to efficiently run the machine without feedback from other individuals to determine the path of the compactor.

It is therefore a primary object of the present invention to provide an operator compartment for a vehicle or machine that is capable of both lateral and/or rotary movement.

It is also an important object of the present invention to provide the operator compartment for a vehicle or machine that is capable of lateral and/or rotary movement independent from any other movements or functions of the vehicle.

It is a further important object of the present invention to provide an apparatus for safely improving the view of an operator of a vehicle or machine by providing an operator compartment or cab that is capable of lateral and/or rotary movement relative to the machine itself, and that can withstand tilt or rollover of the machine during use.

It is a further important object of the present invention to provide controls for lateral and rotary movement of the operator compartment from within the operator compartment.

Additional objects of the invention will be apparent from the detailed descriptions and the claims herein.

BRIEF DESCRIPTION OF THE DRAWINGS

FIG. 10 is a top perspective and exploded view of a carriage assembly of the present invention.

FIG. 11 is a bottom perspective and exploded view of a carriage assembly of the present invention.

DETAILED DESCRIPTION

Figure 12:
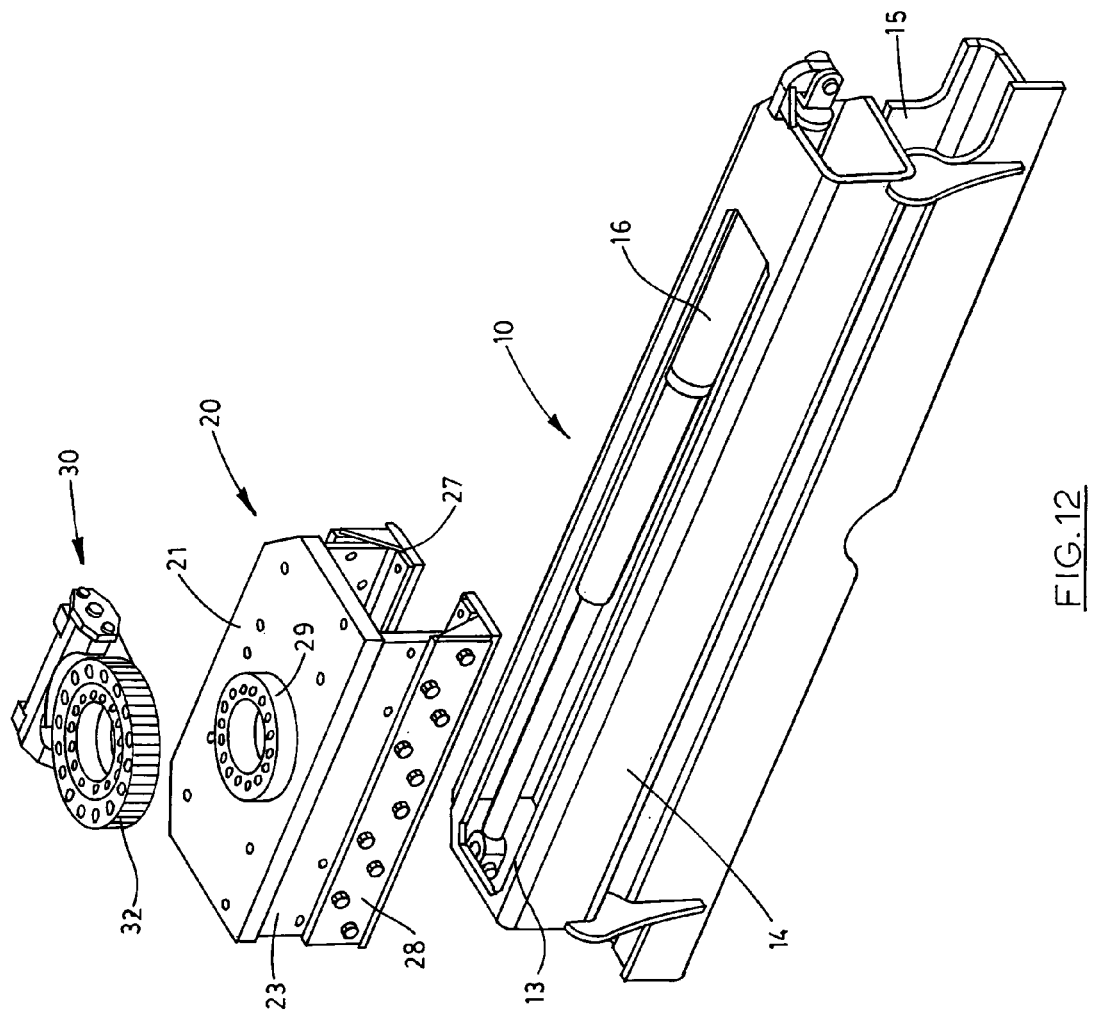
FIG. 12 is an exploded view of a rail, carriage and rotational assembly of the present invention.

It is to be understood that while the following description of the present invention is based on the exemplary illustrated embodiments, the scope of the invention is not limited to this description, the illustrations, nor any of the particular locations or combinations depicted, but may be installed in various alternative locations, and in various alternative combinations, without affecting the scope or functionality thereof. Referring then to the exemplary embodiment illustrated in the drawings wherein like reference characters designates like or corresponding parts throughout the several views, and referring particularly to FIG. 12, it is seen that the invention includes a slide rail assembly 10, a carnage assembly 20, and a rotational assembly 30. The slide rail assembly comprises a rail 14 that is attached to a vehicle or machine chassis using lower mounts or supports 15. Rail 14 may be solid, but is preferably in the form of a hollow sleeve or tube that runs a desired length along the machine. In the exemplary embodiment illustrated in the drawings, rail 14 has a preferred rectangular cross section, although other suitable cross-sectional configurations may be used so long as they provide an adequate surface for supporting the carriage assembly 20. The rail 14 can be mounted in any direction in a generally horizontal plane. In the illustrated embodiment, rail 14 is mounted from side to side (left to right).

Figure 9:
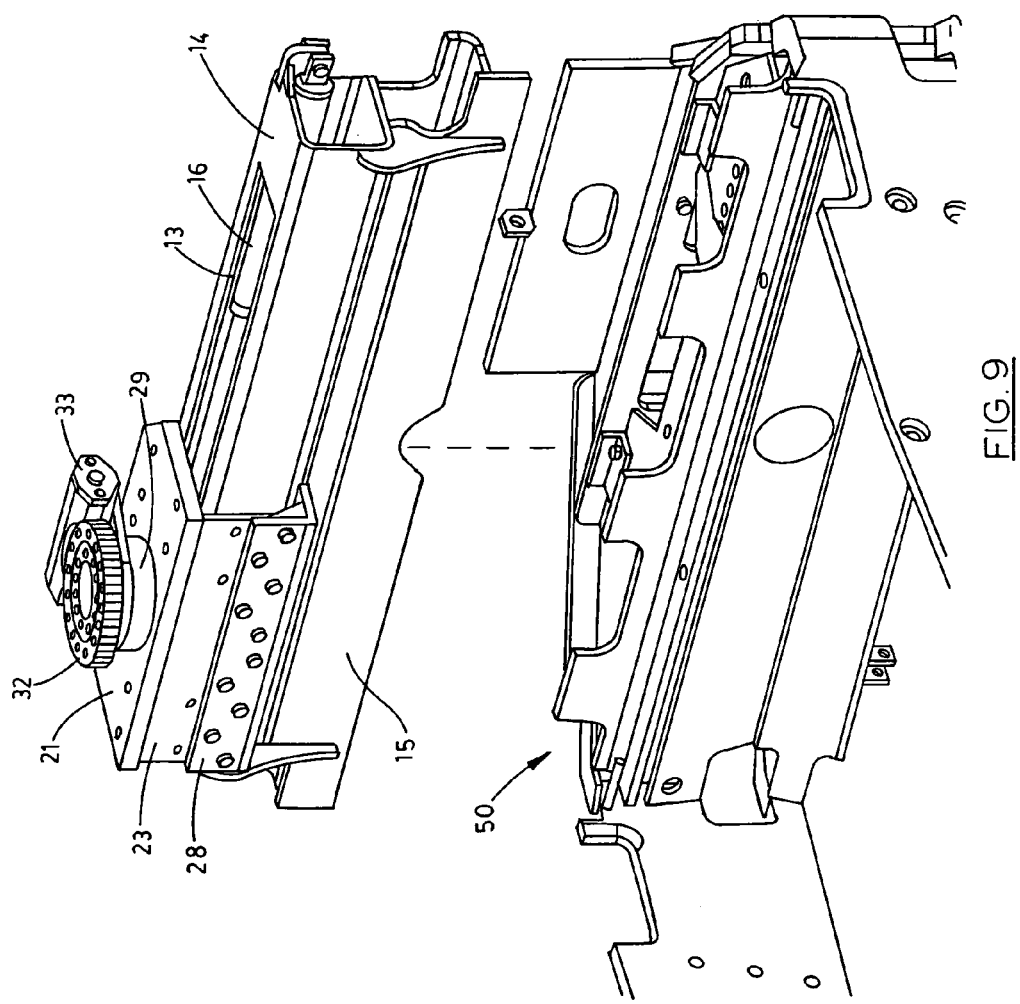
FIG. 9 is a perspective view showing where the present invention attaches to the chassis of a vehicle or machine.

To secure the rail 14 to the body 50 of the vehicle, rail supports 15 are securely attached to the body of the vehicle and to the rail 14, preferably by welding, but may be attached using any conventional means such as the use of nuts and bolts. See FIG. 9. In some situations, the rail 14 may be directly attached to the body 50 of the vehicle. The rail should be attached to the body in such a way that neither the body of the vehicle nor the supports 15 interfere with the path of the carriage assembly 20 over the rail 14.

It is preferable that the rail 14 extend the width of the vehicle, although shorter or longer rails may also be used. It is desirable that the rail 14 extend as far as possible to allow the greatest range of motion of the operator compartment 40. If practical, the rail can extend beyond one or both of the sides of the vehicle.

Slide rail assembly 10 includes a lateral force imparting device 16. This device imparts lateral force to the carriage assembly 20, thereby causing the carriage assembly 20 to move laterally along the rail 14. The lateral force imparting device 16 is fixed at one end either to the rail 14 or the body 50 of the vehicle. The rail or the body of the vehicle functions as a fixed support for the force imparting device 16. The opposite end of device 16 is attached directly or indirectly to the carriage assembly 20, and imparts motion to move carriage assembly 20 back and forth along the rail 14.

In the illustrated embodiment, device 16 is in the form of a telescoping hydraulically powered member provided inside rail 14. Device 16 is connected to the carriage assembly 20 using a linkage (not shown) that passes thought a slot 13 running along rail 14. This prevents device 16 from being obstructed by foreign objects. In addition, the slot 13 allows wires and controls to pass though the slide rail, carriage assembly 20, rotational assembly 30, and into the operator compartment 40.

Figure 1:
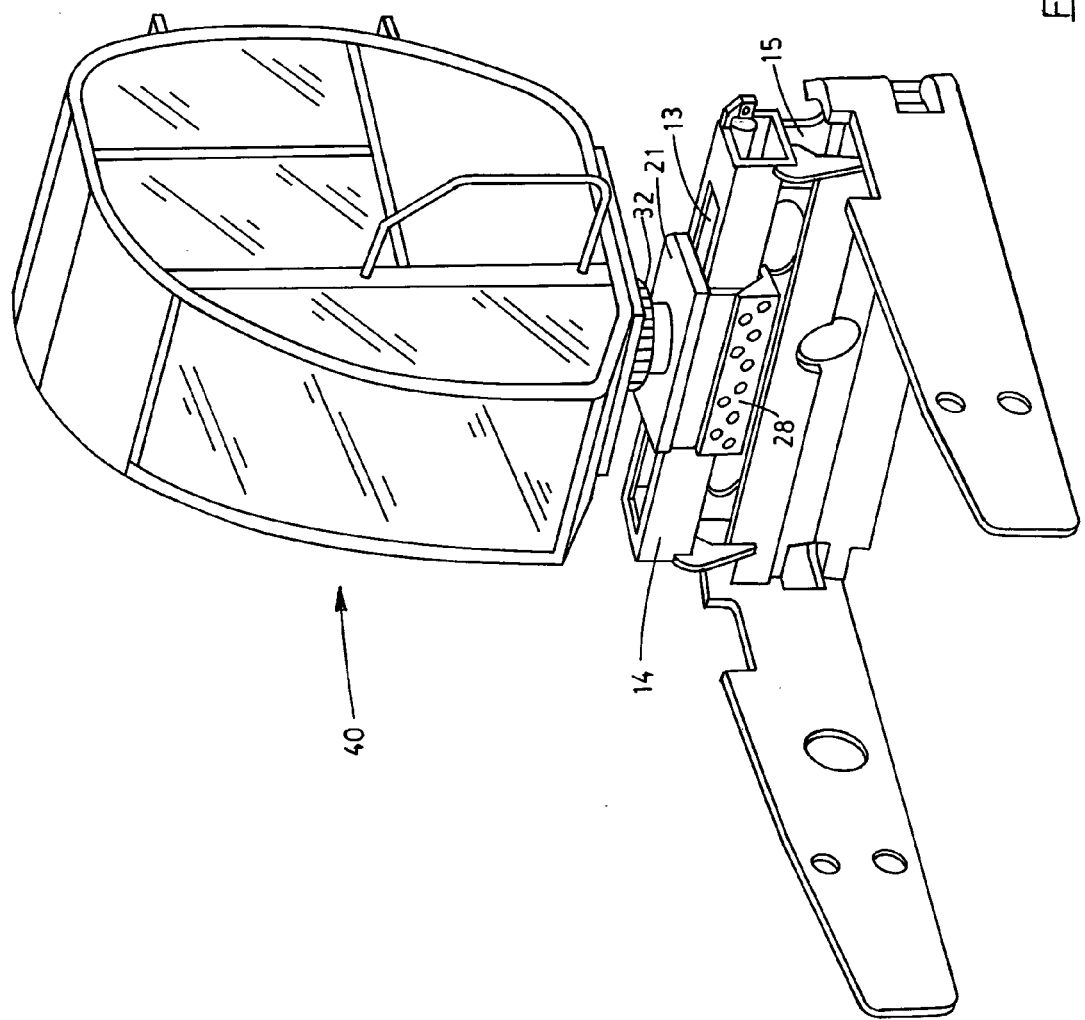
FIG. 1 is a front perspective view of an embodiment of the present invention illustrating the cab in the center facing front.
Figure 2:
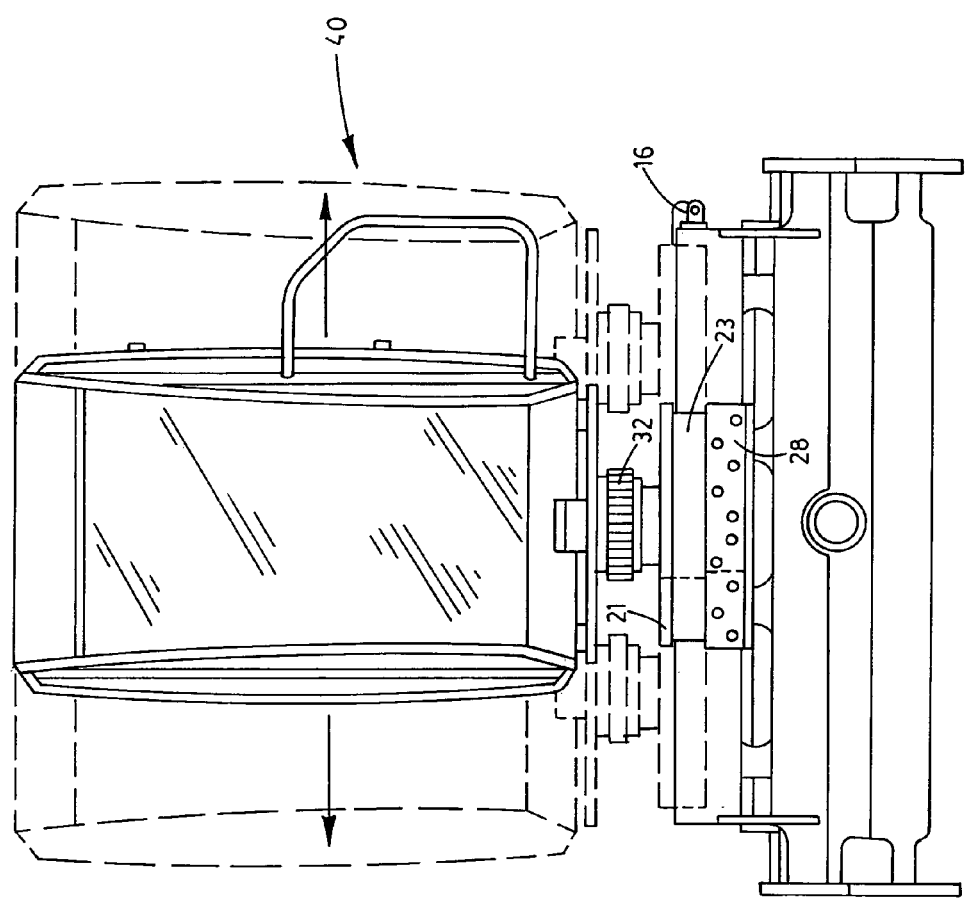
FIG. 2 is a partially cut-away detailed front view of the present invention.
Figure 3:
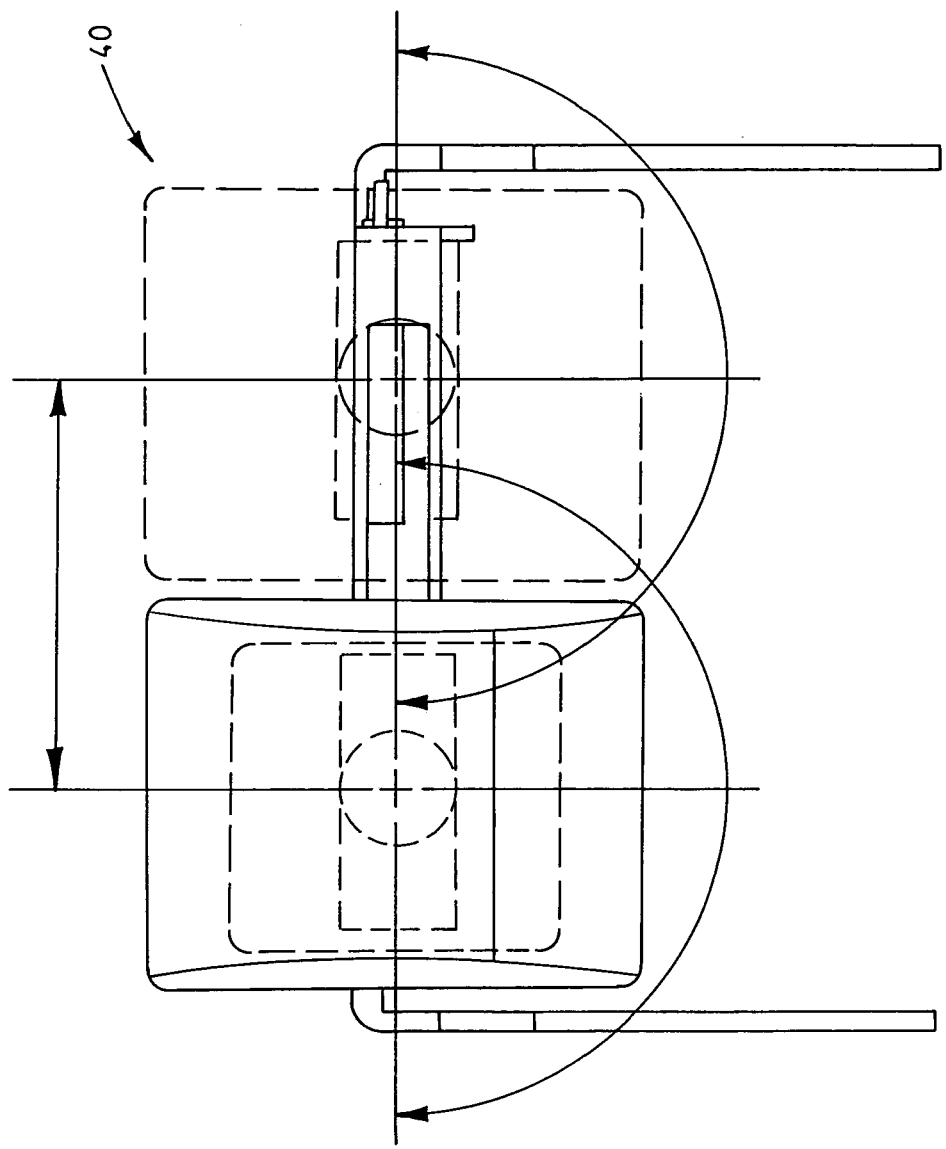
FIG. 3 is a top view showing the lateral and rotational movement available in the present invention.
Figure 4:
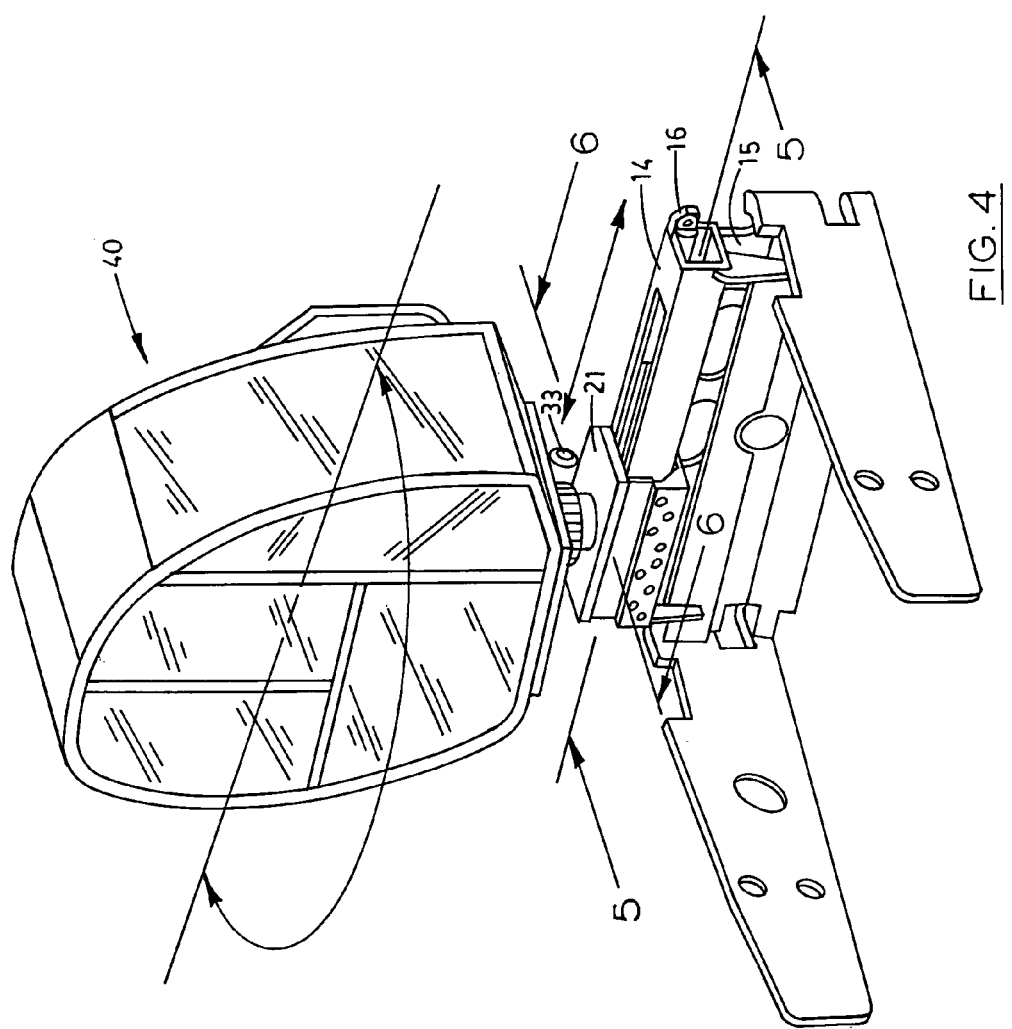
FIG. 4 is another front perspective view of the present invention illustrating the cab moved to one side and rotated.
Figure 5:
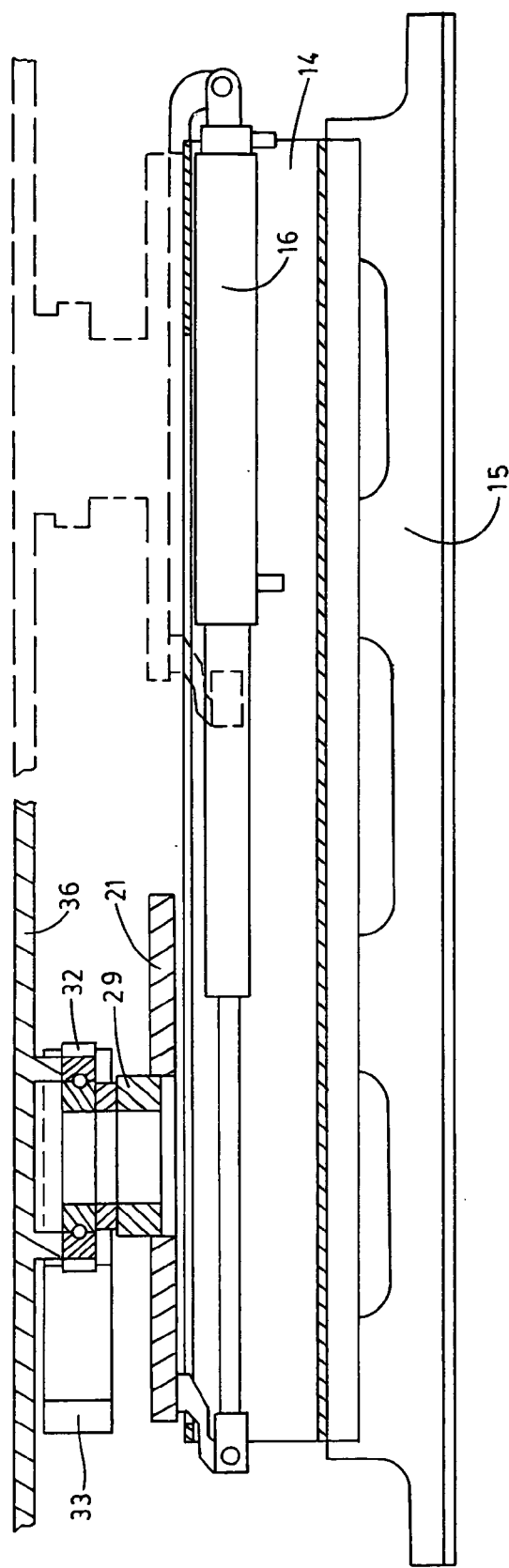
FIG. 5 is a front sectional view along line 5—5 of FIG. 4.
Figure 6:
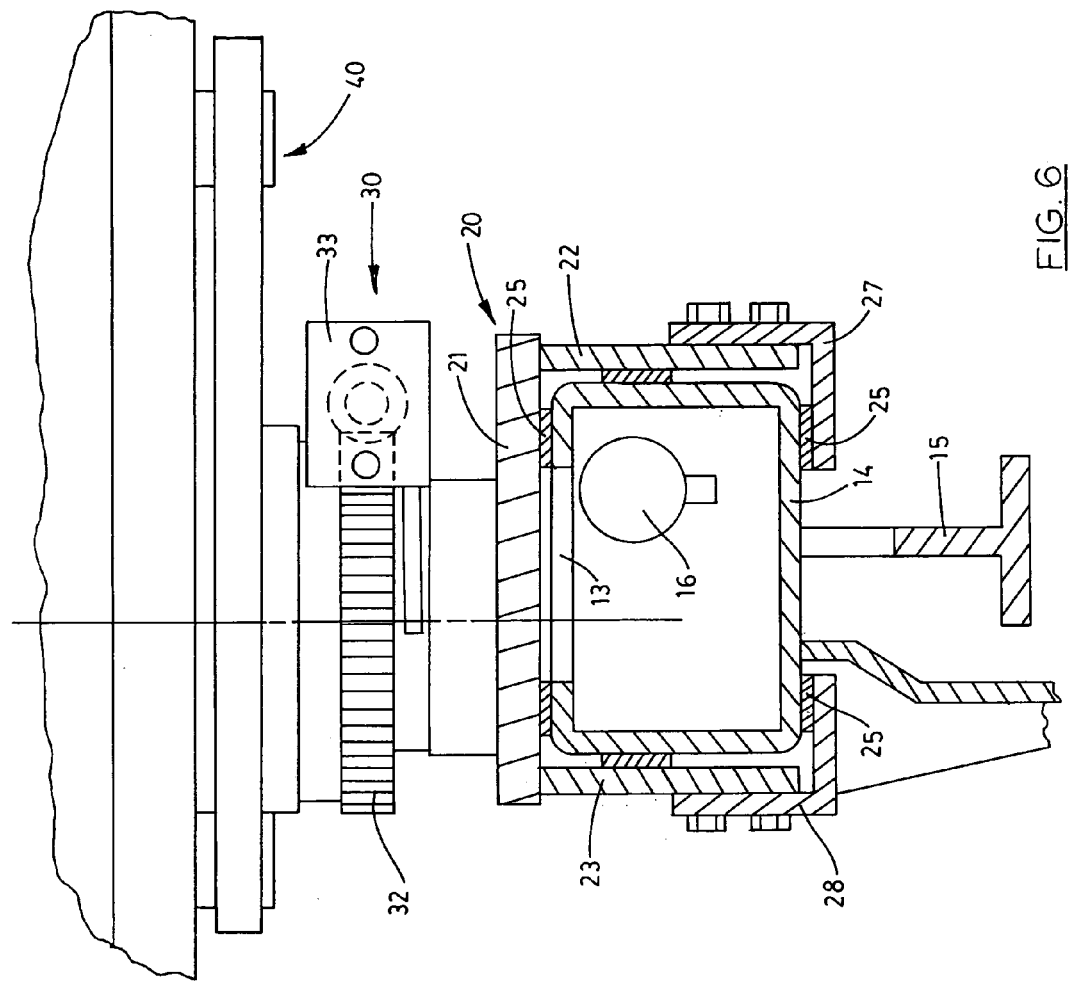
FIG. 6 is a side sectional view along line 6—6 of FIG. 4.
Figure 8:
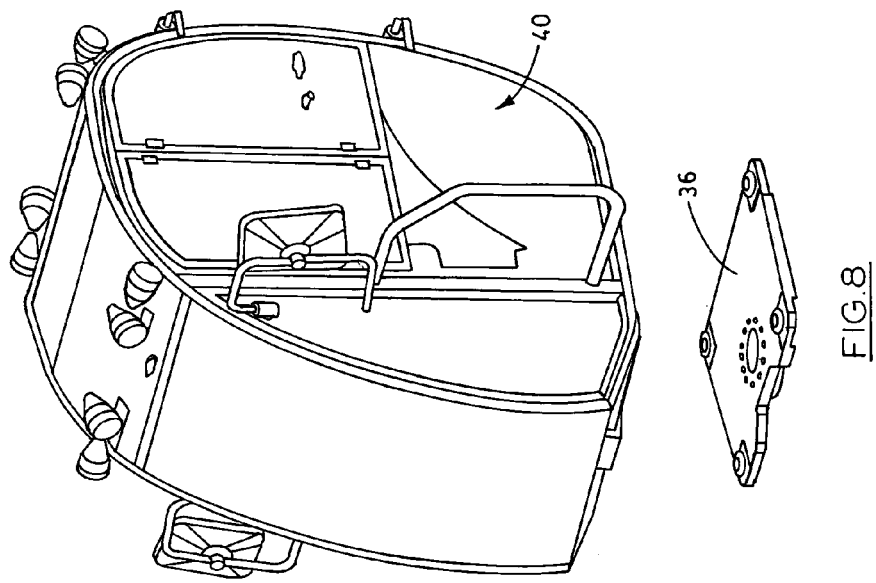
FIG. 8 is a perspective view showing the connection between a cab mount plate and a cab of the present invention.
Figure 7:
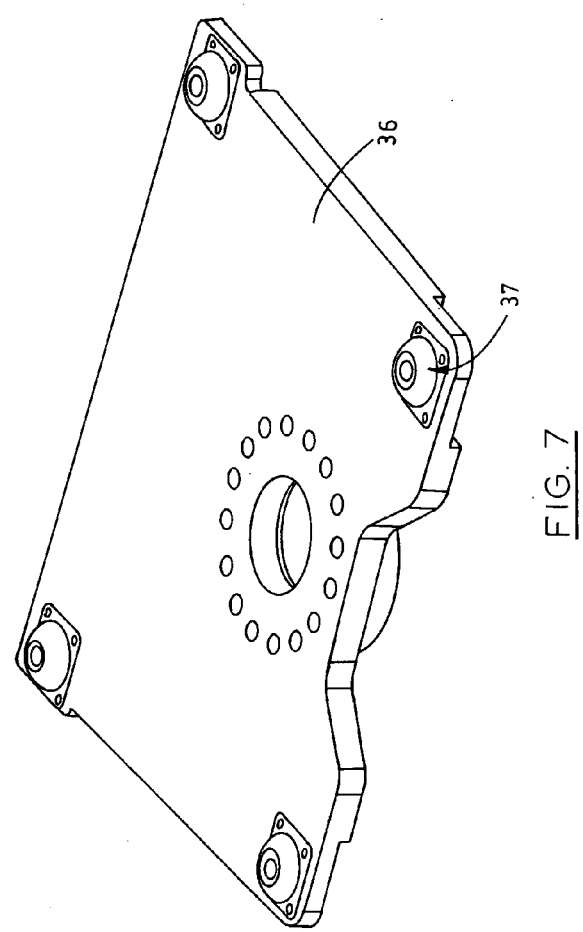
FIG. 7 is a perspective view of a cab mount plate of the present invention.

In the illustrated embodiment detailed in FIGS. 10–11, it is seen that carriage assembly 20 includes an upper platform 21 having two side panels 22 and 23. Platform 21 and panels 22–23 are attached together (preferably welded) forming a partial sleeve having a the shape of an inverted "U" that fits snugly over rail 14 as shown in FIG. 6. One or more bearing surfaces or wear slides 25 are provided on the inside of panels 21–23 which make contact with slide 14. Slides 25 are made of a low-friction material such as TEFLON so as to improve the slidability of the carriage assembly 20 along rail 14. Lubricants or grease may also be applied to or near slides 25 to reduce friction and improve slidable movement. In the illustrated embodiment, each of panels 22–23 is provided with a lower clamping flange 27, 28 having a generally L-shaped configuration. The lower surfaces of flanges 27 and 28 fit under rail 14 to prevent carriage assembly from becoming dislodged therefrom. Additional bearing slides 25 (and lubricant, if desired) are also provided on flanges 27 and 28 to reduce friction. Each of clamp flanges 27–28 is affixed to its respective panel using bolts, fasteners or other suitable attachment means 26. This allows for easy detachment and removal of carriage assembly 20 from rail 14. Alternatively, one or more of flanges 27-28 may be welded to its respective side panel. A support 29 for the rotational member is provided on upper platform 21, and includes a central opening therein.

Turning to FIGS. 6–9, it is seen that the rotational assembly 30 is pivotally mounted to the carriage assembly 20, and fixedly attached to the operator compartment 40. The rotational assembly 30 includes a least one gear 32 oriented in a horizontal plane, and a motion imparting device 33 that is coupled to the gear 32. Gear 32 is preferably a worm gear with associated worm motor 33. Gear 32 fits over support 29 of the carriage assembly 20, and has a central opening therein. Gear 32 is also coupled to cab support plate 36 having dampers 37 thereon which is, in turn, coupled to the operator cab 40. The motion imparting device 33 transmits force to the gear 32 and causing it to rotate with respect to the motion imparting device 33 and to support 29. This rotates plate 36 and cab 40. In an alternative embodiment, the gear may be fixed to support 29 and the motion imparting device 33 attached to plate 36 such that it rotates with respect to the gear. The relative movement of the gear to the motion imparting device 33 creates rotational movement thereby causing the operator compartment 40 to swivel. The operator compartment 40 is capable of at least one hundred and eighty (180) degrees of rotation in either direction from its forward orientation. Plate 36 contains an opening to allow the passage of control wires and connections to the operator compartment 40 without exposing them to significant wear.

In an alternative embodiment, the rotational assembly may be comprised of some other device or combination of devices rather than gears to create the rotational force, such as belts, chains, sprockets or the like.

The operator compartment 40 is attached to the rotational assembly 30 via plate 36. Because of the lateral movement created by the carriage assembly 20 along rail assembly 10, and the rotational movement created by the rotational assembly 30, the operator compartment 40 is capable of traveling the length of the rail 14, while simultaneously being able to pivot or rotate around the rotational assembly 30. The operator compartment has an opening on the floor of the compartment that corresponds to the center of the rotational assembly through which the vehicle control wires and connections can pass. In addition, the controls may include the controls for the lateral and rotary movement of the operator compartment. The lateral control may connect with the lateral force output device, and the rotational control may connect to the motor of the rotational assembly.

It is to be appreciated that the invention is not limited to this illustrative combination of components, and that different combinations of these components may be utilized without departing from the scope of the invention.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A support apparatus for a vehicle cab comprising:
   a. an elongated hollow sleeve attached to and extending in a generally horizontal direction along a body of a vehicle;
   b. a movable carriage slidably deployed on said sleeve, said carriage comprising an upper panel that slides along a top of said sleeve, side panels that slide along sides of said sleeve, and at least one removable lower flange that fits underneath said sleeve;
   c. a support assembly rotatably attached to said carriage; and
   d. an operator compartment operably attached to said support assembly.

2. A support apparatus for a vehicle cab comprising:
   a. an elongated hollow rail attached to and extending in a generally horizontal direction along a body of a vehicle;
   b. a movable carriage slidably deployed on said rail, said carriage comprising an upper panel that slides along a top of said rail, side panels that slide along sides of said rail, and at least one removable lower flange that fits underneath said rail;
   c. a support assembly rotatably attached to said carriage; and
   d. an operator compartment operably attached to said support assembly.

3. The apparatus of claim 2 wherein said rail has a generally rectangular cross sectional shape defining a top, sides and bottom and wherein said carriage is in the form of a partial sleeve having a cross sectional shape corresponding to a portion of said rail for slidably fitting around said portion.

4. A support apparatus for a vehicle cab comprising:
   a. an elongated hollow rail attached to and extending in a generally horizontal direction along a body of a vehicle, said rail having a generally rectangular cross sectional shape defining a top, sides and bottom, and at least one elongated slot along the top;
   b. a movable carriage slidably deployed on said rail, said carnage comprising an upper panel that slides along the top of said rail, side panels that slide along the sides of said rail, and at least one removable lower flange that fits underneath said rail;
   c. a hydraulic member for imparting motion to said carriage;
   d. a support assembly rotatably attached to said carriage, said support assembly comprising gear rotatably mounted to said carriage, and a motor for rotating said gear;
   e. a support plate attached to said gear, said plate having vibration dampers thereon; and
   f. an operator compartment attached to said support plate.

5. The apparatus of claim 4 wherein the operator compartment rotates at least ninety (90) degrees in both directions.

6. The apparatus of claim 4 wherein the operator compartment rotates at least hundred and eighty (180) degrees in both directions.

7. The apparatus of claim 4 wherein said rail extends to at least one side of the vehicle.

8. The apparatus of claim 7 wherein said rail extends beyond at least one side of the vehicle.

9. A support apparatus for a vehicle cab comprising:
   a. an elongated rail assembly attached to and extending in a generally horizontal direction along a body of a vehicle, said rail being in the form of a sleeve having a generally rectangular cross sectional shape;
   b. a movable carriage slidably deployed on said rail assembly, said carriage being in the form of a partial sleeve having a cross sectional shape corresponding to a portion of said rail sleeve for slidably fitting around said portion, said carriage further comprising an upper panel that slides along a top of said rail, side panels that slide along sides of said rail, and at least one removable lower flange that fits underneath said rail;
   c. a support assembly rotatably attached to said carriage; and
   d. an operator compartment attached to said rotatable support assembly.

10. A support apparatus for a vehicle cab comprising:
    a. an elongated rail assembly attached to and extending laterally along a body of vehicle wherein said is the form of a hallow member having an elongated slot located thereon;
    b. a movable carriage slidably deployed on said rail assembly, said carriage having an opening therein;
    c. a support assembly rotatably attached to said carriage, said support assembly having an opening therein; and
    d. an operator compartment operably attached to said rotatable support assembly.

11. A support apparatus for a vehicle cab comprising:
    a. an elongated rail assembly attached to and extending in a generally horizontal direction along a body of a vehicle;
    b. a movable carriage slidably deployed on said rail assembly;
    c. a support assembly rotatably attached to said carriage; and
    d. an operator compartment attached to said rotatable support assembly wherein said rail is in the form of a hollow sleeve, an elongated slot is provided in said rail, and openings are provided in both said carriage and said rotatable support assembly in the vicinity of said slot providing a channel for at least one wire to extend from inside said rail to said compartment.

12. The apparatus of claim 11 wherein at least one low-friction surface is provided between said rail and said carriage.

13. The apparatus of claim 11 wherein said rotatable support assembly comprises a worm gear mounted to said carriage, and a worm motor rotatably engaged with said gear.

14. The apparatus of claim 11 wherein a first motion imparting member moves said carriage along said rail assembly, and a second motion imparting member rotates said support assembly and operator compartment.

15. The apparatus of claim 14 wherein said first motion imparting member is a telescoping hydraulic member, and said second motion imparting member is a motor.

16. The apparatus of claim 11 wherein said rotatable support assembly comprises a worm gear rotatably mounted to said carriage, and a worm motor for rotating said gear.

17. The apparatus of claim 16 wherein a support plate is attached between said gear and said compartment, said support plate including at least one vibration damping member.

18. A method for improving the field of view of an operator of a vehicle comprising the steps of:
    a. deploying a carriage for slidable movement along a rail laterally mounted on said vehicle, said rail being in the form of a hollow sleeve;
    b. pivotally attaching an operator compartment to the carriage;
    c. imparting lateral force to the carriage to move said carriage and operator compartment along the rail to improve the view of an operator therein; and
    d. imparting rotational force to the operator compartment to cause the operator compartment to turn to further improve the view of said operator.

19. A method for improving the field of view of an operator of a vehicle comprising the steps of:
    a. deploying a carriage for slidable movement along a rail laterally mounted on said vehicle, said rail being in the form of a hollow sleeve having an elongated slot therein, said carriage having an opening therein in the vicinity of said slot;
    b. pivotally attaching an operator compartment to the carriage using a rotatable support assembly having an opening therein in the vicinity of said slot, each of said openings being intended to receive at least one wire;
    c. imparting lateral force to the carriage to push said carriage and operator compartment along the rail to improve the view of an operator therein; and
    d. imparting rotational force to the operator compartment to cause the operator compartment to turn to further improve the view of said operator.

20. The method of claim 19 further comprising the additional step of simultaneously applying lateral and rotational force to cause the simultaneous lateral and rotational movement of the operator compartment.

21. A method for improving the field of view of an operator of a vehicle comprising the steps of:
    a. deploying a carriage for slidable movement along a rail laterally mounted on said vehicle, said rail being in the form of a sleeve having a generally rectangular cross sectional shape, said carriage being in the form of a partial sleeve having a cross sectional shape corresponding to a portion of said rail sleeve for slidably fitting around said portion, said carnage further comprising an upper panel that slides along a top of said rail, side panels that slide along sides of said rail, and at least one removable lower flange that fits underneath said rail;
    b. pivotally attaching an operator compartment to the carriage;
    c. imparting lateral force to the carriage to push said carriage and operator compartment along the rail to improve the view of an operator therein; and
    d. imparting rotational force to the operator compartment to cause the operator compartment to turn to further improve the view of said operator.

22. A method for moving an operator compartment of a machine comprising the steps of:
    a. applying a lateral force to a carnage assembly slidably deployed along a rail, said rail being in the form of a hollow sleeve attached to said machine; and
    b. applying a rotational force to a support assembly pivotally attached to said carriage to turn an attached operator compartment on the rotational assembly.

23. The method of claim 22 wherein the lateral force and the rotational force are applied simultaneously.

* * * * *